United States Patent
Lim et al.

(10) Patent No.: US 8,155,685 B2
(45) Date of Patent: Apr. 10, 2012

(54) METHOD AND APPARATUS FOR DETERMINING REVERSE TRANSMISSION POWER OF MOBILE STATION IN AN ORTHOGONAL FREQUENCY DIVISION MULTIPLEXING SYSTEM

(75) Inventors: Yeon-Ju Lim, Seoul (KR); Hwan-Joon Kwon, Suwon-si (KR); Jae-Chon Yu, Suwon-si (KR); Dong-Hee Kim, Yongin-si (KR); Seung-Kyun Oh, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 578 days.

(21) Appl. No.: 12/027,609

(22) Filed: Feb. 7, 2008

(65) Prior Publication Data

US 2008/0214229 A1  Sep. 4, 2008

(30) Foreign Application Priority Data

Feb. 8, 2007 (KR) .................... 10-2007-0013450
Feb. 9, 2007 (KR) .................... 10-2007-0014073

(51) Int. Cl.
*H04B 7/00* (2006.01)
(52) U.S. Cl. ............ 455/522; 455/69; 455/70; 370/315; 370/318

(58) Field of Classification Search ............... 455/522, 455/69–70; 370/318
See application file for complete search history.

(56) References Cited

U.S. PATENT DOCUMENTS

| 2005/0002325 | A1  | 1/2005 | Giannakis et al. |
| 2006/0093062 | A1  | 5/2006 | Yun et al. |
| 2008/0153535 | A1* | 6/2008 | Gorokhov et al. ............ 455/522 |
| 2008/0233901 | A1* | 9/2008 | Ebiko et al. ................ 455/114.2 |
| 2009/0098899 | A1* | 4/2009 | Gorokhov et al. ............ 455/522 |
| 2010/0188984 | A1* | 7/2010 | Futagi et al. .................. 370/252 |

FOREIGN PATENT DOCUMENTS

| JP | 2001-339361 | 12/2001 |
| JP | 2002-044052 | 2/2002 |
| WO | WO 2003/081821 | 10/2003 |
| WO | WO 2006/036052 | 4/2006 |
| WO | WO 2006/134946 | * 12/2006 |

* cited by examiner

*Primary Examiner* — Fayyaz Alam
(74) *Attorney, Agent, or Firm* — The Farrell Law Firm, P.C.

(57) ABSTRACT

A mobile station apparatus for determining reverse transmission power in an Orthogonal Frequency Division Multiplexing system is provided. A reception module receives from a base station a Reverse-Link Assignment Message including a Packet Format (PF) field and a Reverse-Link Power Control (RLPC) field. A power level adjuster determines a nominal reverse transmission power level depending on information of the PF field, and determines a relative final transmission power level shifted by an offset value defined in the RLPC field from the nominal transmission power level.

6 Claims, 4 Drawing Sheets

METHOD AND APPARATUS FOR DETERMINING REVERSE TRANSMISSION POWER OF MOBILE STATION IN AN ORTHOGONAL FREQUENCY DIVISION MULTIPLEXING SYSTEM

PRIORITY

This application claims priority under 35 U.S.C. §119(a) to Korean Patent Applications filed in the Korean Intellectual Property Office on Feb. 8, 2007 and assigned Serial No. 2007-13450, and on Feb. 9, 2007 and assigned Serial No. 2007-14073, the contents of both of which are incorporated herein by reference.

BACKGROUND OF THE INVENTION

1. Field of the Invention

The present invention relates generally to a method and apparatus for determining transmission power of a mobile station in a mobile communication system, and in particular, to a method and apparatus for determining initial transmission power of a mobile station in an Orthogonal Frequency Division Multiplexing (OFDM) system.

2. Description of the Related Art

Recently, in the mobile communication system, extensive research has been conducted on an OFDM scheme for use in high-speed data transmission over a wire/wireless channel. The OFDM scheme, for transmitting data using multiple carriers, is a type of Multi-Carrier Modulation (MCM) scheme that converts a serial input symbol stream into parallel symbol streams and modulates each of them with multiple orthogonal sub-carriers, i.e., multiple sub-carrier channels, before transmission.

The OFDM scheme is widely applied to digital transmission technologies such as Digital Audio Broadcasting (DAB), Digital Video Broadcasting (DVB), Wireless Local Area Network (WLAN) and Wireless Asynchronous Transfer Mode (WATM). In particular, as the OFDM scheme overlaps frequency spectra, it is efficient in frequency utilization, robust against frequency-selective fading and multi-path fading, effective in reducing an Inter-Symbol Interference (ISI) effect using a guard interval, and simple as to hardware design of the equalizer structure. In addition, since the OFDM scheme is robust against impulse noises, it can be positively used for communication systems.

In the OFDM scheme-based mobile communication system (hereinafter OFDM system), a Forward-link Shared Control Channel (F-SCCH) is for transmitting a message related to forward/reverse resource assignment and management, format definition of data packet, and access attempt authentication of a mobile station. In order for the mobile station to actually transmit data in the OFDM system, control information transmission over the F-SCCH should be achieved. The longest-length control channel message transmitted over the F-SCCH has, for example, a 25-bit length.

Among the multiple control channel messages transmitted over the F-SCCH, a Reverse-Link Assignment Message (RLAM), which is used for assigning or releasing the resources that the mobile station should use in the reverse link, includes fields for (i) a characteristic (e.g., indicating whether the corresponding resource is persistent assignment resource) of resources assigned to a mobile station, (ii) a Packet Format (PF) for defining a Modulation and Coding Scheme (MCS), (iii) a pilot pattern, and (iv) a Reverse-Link Power Control (RLPC).

Table 1 shows some of the fields constituting the RLAM in the conventional mobile communication system.

TABLE 1

| Field | Block type | MAC ID | Persistent | Chan ID | RL Pilot | PF | Ext. TX | RLPC |
|---|---|---|---|---|---|---|---|---|
| # bits | 4 | 9-11 | 1 | 6 | 1 | 4 | 1 | 5 |
| RLAM | 0001 | 0 | 1 | 1 | 1 | 1 | 0 | 1 |

In Table 1, Block type='0001' indicates the RLAM, a field value '0' indicates an inactive state of the corresponding field and a field value '1' indicates an active state of the corresponding field. The total number of bits that the base station needs to transmit the RLAM is 25.

The RLPC field is carrier-to-interference Power Spectral Density (PSD) information for the data provided to the mobile station so that the mobile station may determine an initial transmission PSD that it should use when transmitting data using the reverse resources assigned from the base station, and the carrier-to-interference PSD information for the data will be referred to herein as 'DataCtoI$_{assigned}$'. The DataCtoI$_{assigned}$, as defined in Equation (1), is applied for determining a transmission PSD increment $\Delta_{LX}$ of the mobile station.

$$\Delta_{LX} = \text{IoT} - p\text{CoT} + \text{DataCtoI}_{assigned} \qquad (1)$$

In Equation (1), IoT denotes an Interference-over-Thermal PSD that the base station receives from adjacent cells, and pCoT denotes a Carrier-over-Thermal PSD for a pilot. These PSD values can be transmitted over a separate control channel.

When several possible PFs are considered, if a scope of DataCtoI$_{assigned}$ required in the general level is assumed to be, for example, −5 dB to 25 dB, and the scope of the DataCtoI$_{assigned}$ is divided by a magnitude of 1 dB, a total of 31 power levels are generated, so 5 bits are needed to express the power levels. For example, when 5-bit information of '00001' to '11111' is used to express the power levels, the mobile station, upon receiving '00001' from the base station, determines −5 dB as a required reception DataCtoI$_{assigned}$, and uses 8 dB for '01101'. Therefore, the mobile station reads the 5-bit information in the RLPC field, and determines a level of the transmission PSD, with which it will transmit data, depending on the read information.

FIG. 1 illustrates generally a method for determining reverse transmission power of a mobile station in a conventional OFDM system, and in particular, a mobile station's operation of determining transmission power of data using a RLPC field of an RLAM.

Referring to FIG. 1, in step 101, a mobile station receives from a base station an F-SCCH over which an RLAM is transmitted. Upon detecting successful demodulation of the F-SCCH in step 103, the mobile station proceeds to step 105 where it reads 5-bit information as a field value of an RLPC field from the RLAM. Thereafter, in step 107, the mobile station determines a level of initial transmission power according to a DataCtoI$_{assigned}$ value corresponding to the RLPC field.

Since the above-described prior art allows the mobile station to determine transmission power it will use, after reading the RLPC field inserted in the RLAM, and considering only the RLPC field in determining the level of the transmission power, the required amount of information of the RLPC field increases with the number of power levels that the base station desires to support. Therefore, according to the prior art, the size of the RLPC field may be larger than necessary in the RLAM.

SUMMARY OF THE INVENTION

An aspect of the present invention is to address at least the problems and/or disadvantages and to provide at least the advantages described below. Accordingly, an aspect of the present invention is to provide a method and apparatus capable of reducing an amount of control information that is transmitted to a mobile station for transmission power control of the mobile station in an OFDM system.

An aspect of the present invention is to provide a method and apparatus capable of reducing a required amount of information of an RLPC field in an RLAM which is transmitted to a mobile station for transmission power control of the mobile station in an OFDM system.

According to the present invention, there is provided a method for determining reverse transmission power by a mobile station in an OFDM system, including receiving from a base station an RLAM including a PF field and an RLPC field, determining a nominal reverse transmission power level depending on information of the PF field, and determining a relative final transmission power level shifted by an offset value defined in the RLPC field from the nominal transmission power level.

According to the present invention, there is provided a mobile station apparatus for determining reverse transmission power in an Orthogonal Frequency Division Multiplexing (OFDM) system, including a reception module for receiving from a base station an RLAM including a PF field and an RLPC field, and a power level adjuster for determining a nominal reverse transmission power level depending on information of the PF field, and determining a relative final transmission power level shifted by an offset value defined in the RLPC field from the nominal transmission power level.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Figure 1:
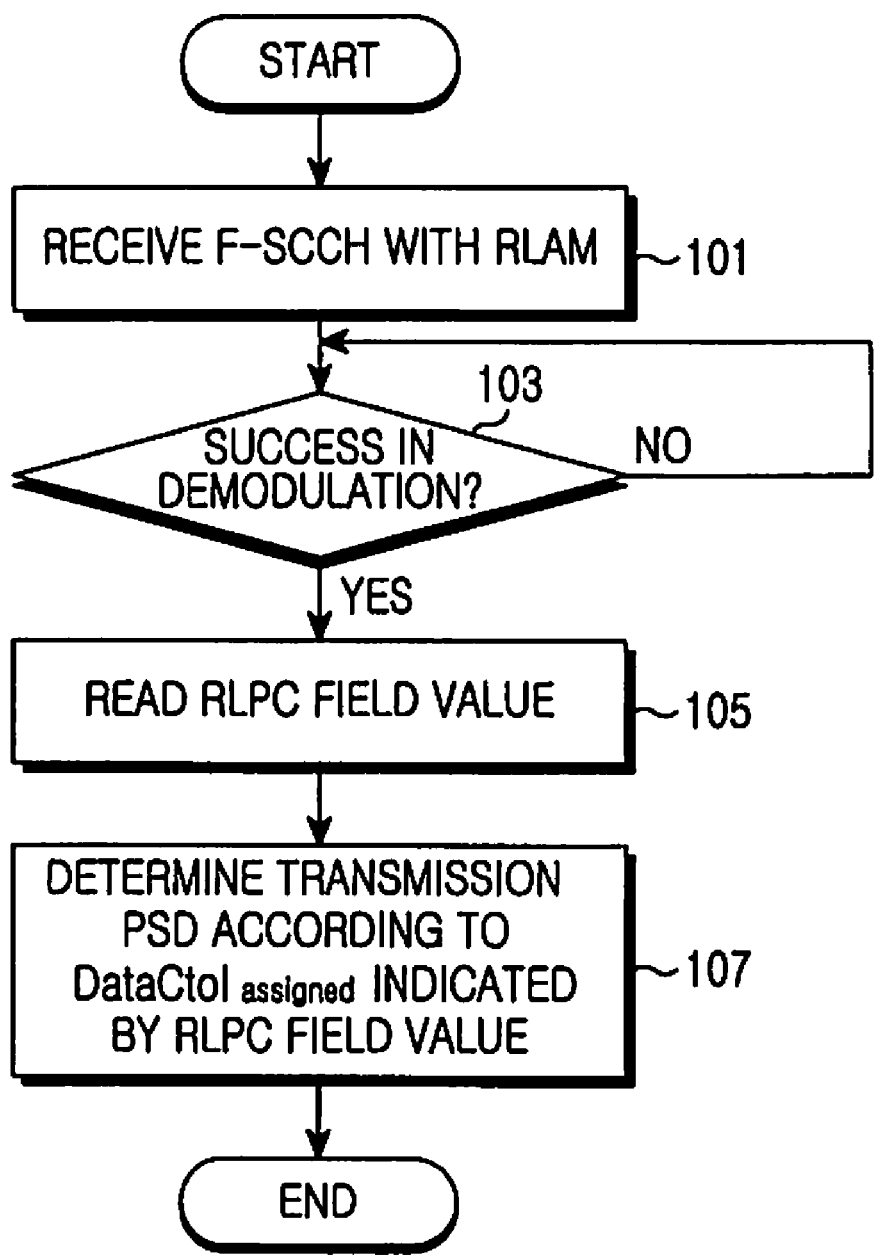
FIG. 1 illustrates a method for determining reverse transmission power of a mobile station in a conventional OFDM system.

Preferred embodiments of the present invention will now be described in detail with reference to the annexed drawings. In the following description, a detailed description of known functions and configurations incorporated herein has been omitted for the sake of clarity and conciseness.

Generally, when a mobile station transmits data, a level of its transmission power may have a correlation with the packet format that the mobile station intends to use. That is, as the mobile station uses a higher-order modulation scheme, it should use a higher power level in order to obtain its desired Signal-to-Noise Ratio (SNR), and in the lower-order modulation scheme, the mobile station can use lower-level power. Therefore, the use of a correlation between a PF used for determining a Modulation and Coding Scheme (MCS) and the transmission power makes it possible to use a power level that is associated with the PF on a one-to-one basis.

Therefore, during data transmission of a mobile station based on the PF, if it is possible to determine an initial transmission power level, it is possible to reduce the number of bits required for an RLPC field, without considering only the RLPC field for power level determination of the mobile station as in the prior art.

In addition, since the mobile station determines the initial transmission power level based on the PF even though the number of bits required in the RLPC field is not reduced, it is possible to perform more accurate power control.

To this end, the present invention discloses a scheme of using an RLPC field of an RLAM transmitted over an F-SCCH to determine an initial transmission power level of a mobile station, in such a manner of using a PF field of the RLAM so as to reduce the required number of bits of the RLPC. In this scheme, the present invention can efficiently support a Hybrid Automatic Repeat Request (HARQ) operation of a base station.

Table 2 shows preferred carrier-to-interference PSD information (hereinafter $DataCtoI_{nominal.pf}$) for data associated with each PF.

TABLE 2

| PF | $DataCtoI_{nominal.pf}$ |
|----|-------------------------|
| 1  | 0 dB                    |
| 2  | 1 dB                    |
| 3  | 2 dB                    |
| 4  | 3 dB                    |
| .  | .                       |
| .  | .                       |
| .  | .                       |
| 16 | 15 dB                   |

A mobile station may previously store therein the information of Table 2, or may acquire the information through signaling with a base station. Therefore, once the mobile station reads a PF field of an RLAM, it can immediately check $DataCtoI_{nominal.pf}$ associated with the PF, and determine an initial transmission power level of data according to the checked $DataCtoI_{nominal.pf}$. If there is a definition of 16 types of PFs, each of which is composed of a pair of a modulation scheme and a coding rate as shown in Table 2, the number of '$DataCtoI_{nominal.pf}$'s associated with the PFs is also 16.

It will be assumed herein that a mapping table (hereinafter PF mapping table) between the PF and the $DataCtoI_{nominal.pf}$ shown in Table 2, is stored in a memory of the mobile station. Therefore, with the use of the PF mapping table, it is possible to nominally determine an initial transmission power level of the mobile station only with the PF without the need for other information. That is, in order to successfully demodulate the data transmitted from the mobile station, a base station provides the mobile station with information on the PF for the transmission data of the mobile station. According to the present invention, the mobile station can not only determine the packet format of data it should use, using the PF field among several fields of the RLAM, but also determine the initial transmission power level of data according to the mapping table between the PF and the $DataCtoI_{nominal.pf}$.

A description will now be made of a scheme for efficiently supporting Hybrid Automatic Repeat reQuest (HARQ) in the process of performing reverse transmission power control of a mobile station using the PF according to the present invention.

HARQ is one of the important technologies used for increasing reliability of data transmission and data throughput in the packet-based mobile communication system. HARQ refers to a combination of Automatic Repeat reQuest (ARQ) and Forward Error Correction (FEC) technologies. ARQ is widely used in the wire/wireless data communication systems, and with the use of the ARQ technology, a transceiver assigns a sequence number to a transmission data packet according to a scheme, before transmission, and a data receiver sends to the transmitter a retransmission request for a packet with a missing number among the received packets using the sequence numbers, thereby achieving reliable data transmission.

FEC refers to a technology for adding redundant bits to transmission data according to a rule, before transmission, as with the convolutional coding or turbo coding, to thereby overcome a possible error generated in the noise or fading environment occurring in the data transmission/reception process, thereby demodulating the originally transmitted data. In the mobile communication system using HARQ combined of ARQ and FEC, a receiver performs Cyclic Redundancy Check (CRC) on the data decoded through a specific inverse FEC process for received data to determine whether there is any error in the received data, and if there is no error, feedback-transmits an ACKnowledgement (ACK) to a transmitter so that it may transmit the next data packet. However, if it is determined from the CRC check result that there is an error in the received data, the receiver feedback-transmits a Non-ACKnowledgement (NACK) to the transmitter so that it may retransmit the packet it previously transmitted.

If the maximum number of transmissions supported by HARQ is 6, the base station performs retransmission on the same packet, for example, 5 times, excluding the initial transmission packet. In this case, the base station sets the target number of HARQ transmissions, and 'the target number of HARQ transmissions is 3' is such that when the base station has performed 3 transmissions on the corresponding packet, the successful packet demodulation of the mobile station within the 3 transmissions is 99% possible.

Even the HARQ performed in the reverse link conducts the same operation of allowing the base station to feedback-transmit ACK/NACK for the packet transmitted by the mobile station, and when the target number of HARQ transmissions is 3, it should adjust data transmission power of the mobile station so that the base station can successfully demodulate the data within 3 transmissions performed by the mobile station. When the base station operates in the mobile communication system to which the HARQ technology is applied in this manner, the base station needs to change the target number of HARQ transmissions, rather than fixing the target number of HARQ transmissions.

This means that because a degree of the allowable delay differs according to whether the type of the traffic to be transmitted by the mobile station is voice or burst data such as Best Effort (BE), the base station sets a small target number of HARQ transmissions when the shorter delay is required, and sets a large target number of HARQ transmissions when the longer delay is allowable. To this end, the present invention can first determine nominal transmission power of the mobile station depending on the PF information transmitted over the RLAM, and then accurately adjust transmission power of the mobile station using the RLPC information transmitted over the RLAM, similarly for the determined transmission power level of data, thereby finally determining the data transmission power of the mobile station.

That is, the present invention nominally determines a level of initial transmission power to be assigned to the data, not only depending on the existing RLPC field included in the RLAM but also depending on the PF, for additional transmission power level adjustment for the mobile station. Since the nominal transmission power level is determined using the PF, the required number of cases is not large, in which the RLPC field of the RLAM should be expressed as a PDS offset value (hereinafter DataCtoIOffset value) for additional adjustment of the power level of the mobile station. Therefore, if a size of the RLPC field is assumed to be, for example, 4 bits, a total of 16 PDS offset values can be supported.

If the mobile station reads a PF field of the RLAM received from the base station to determine a $DataCtoI_{nominal.pf}$ value associated therewith using the PF mapping table stored in the memory, nominally determines a data transmission power level of the mobile station using the $DataCtoI_{nominal.pf}$ value, and then determines the final transmission power level using the DataCtoIOffset value defined in the RLPC field for additional transmission power level adjustment, then it is possible to reduce the number of bits required for the RLPC field in the RLAM.

As described above, the mobile communication system to which the present invention is applied determines a data transmission power level of the mobile station using the following two major methods.

Transmission Power Level Determination Method

1) A first method predefines a nominal transmission power level according to $DataCtoI_{nominal.pf}$ uniquely associated with each PF (using, for example, a PF-to-$DataCtoI_{nominal.pf}$ mapping table).

2) A second method determines the relative final transmission power level shifted by an offset value from the nominal transmission power level using a DataCtoIOffset value predefined in the RLPC field to additionally adjust the nominal transmission power level.

Unlike the conventional scheme of expressing $DataCtoI_{assigned}$ using only the RLPC field, the present invention using both the PF field and the RLPC field can separately express for $DataCtoI_{assigned}$ decision two terms such as in the right side of Equation (2), as follows:

$$DataCtoI_{assigned} = DataCtoI_{nominal.pf} + DataCtoIOffset \qquad (2)$$

Figure 2:
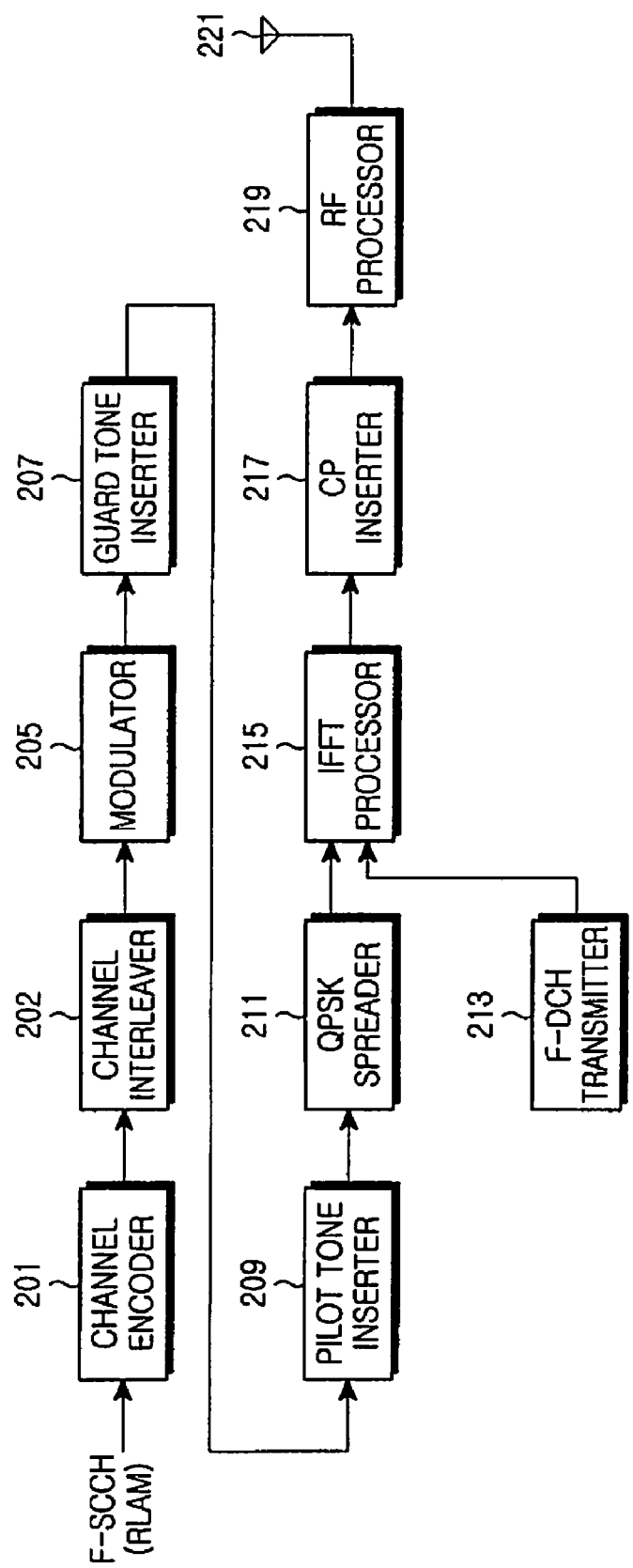
FIG. 2 illustrates a structure of a transmission apparatus in an OFDM system to which the present invention is applied.

FIG. 2 illustrates a structure of a transmission apparatus in an OFDM system to which the present invention is applied.

In the transmission apparatus of FIG. 2, it is assumed that a control channel (or F-SCCH) and a data channel (or Forward-link Data Channel (F-DCH)) are simultaneously transmitted. The F-SCCH including RLAM information passes through a transmission module including an encoder 201 for encoding data on a control channel, an interleaver 203 for interleaving the coded data, a modulator 205 for modulating the interleaved data, a guard tone inserter 207 for inserting a guard tone to reduce interference of an out-band signal, a pilot tone inserter 209 for inserting a pilot tone for channel estimation at a mobile station, and a QPSK (Quadrature Phase Shift Keying) spreader for spreading the pilot tone-inserted signal using, for example, a QPSK scheme. The QPSK spreader, used herein as an example, can be replaced with other spreading schemes known in the art.

The required number of bits of the RLPC field included in the RLAM information according to the present invention is less than the number of bits of the conventional RLPC field, because it only needs the number of bits available for additional power control of the mobile station.

In addition, the transmission module includes an Inverse Fast Fourier Transform (IFFT) processor 215 for multiplexing the symbols transmitted over the F-SCCH and the F-DCH, and then IFFT-processing the multiplexed symbols into OFDM data, a Cyclic Prefix (CP) inserter 217 for inserting a CP in front of the OFDM data for signal interference prevention, a Radio Frequency (RF) processor 219 for frequency-up-converting the CP-inserted OFDM signal into an RF signal and transmitting the RF signal to a wireless network via an antenna 221, and an F-DCH transmitter 213 for performing coding and modulation for transmission of the F-DCH.

Since a structure of the F-DCH transmitter 213 is well known in the art, a detailed description thereof will be omitted herein for the sake of simplicity.

Figure 3:
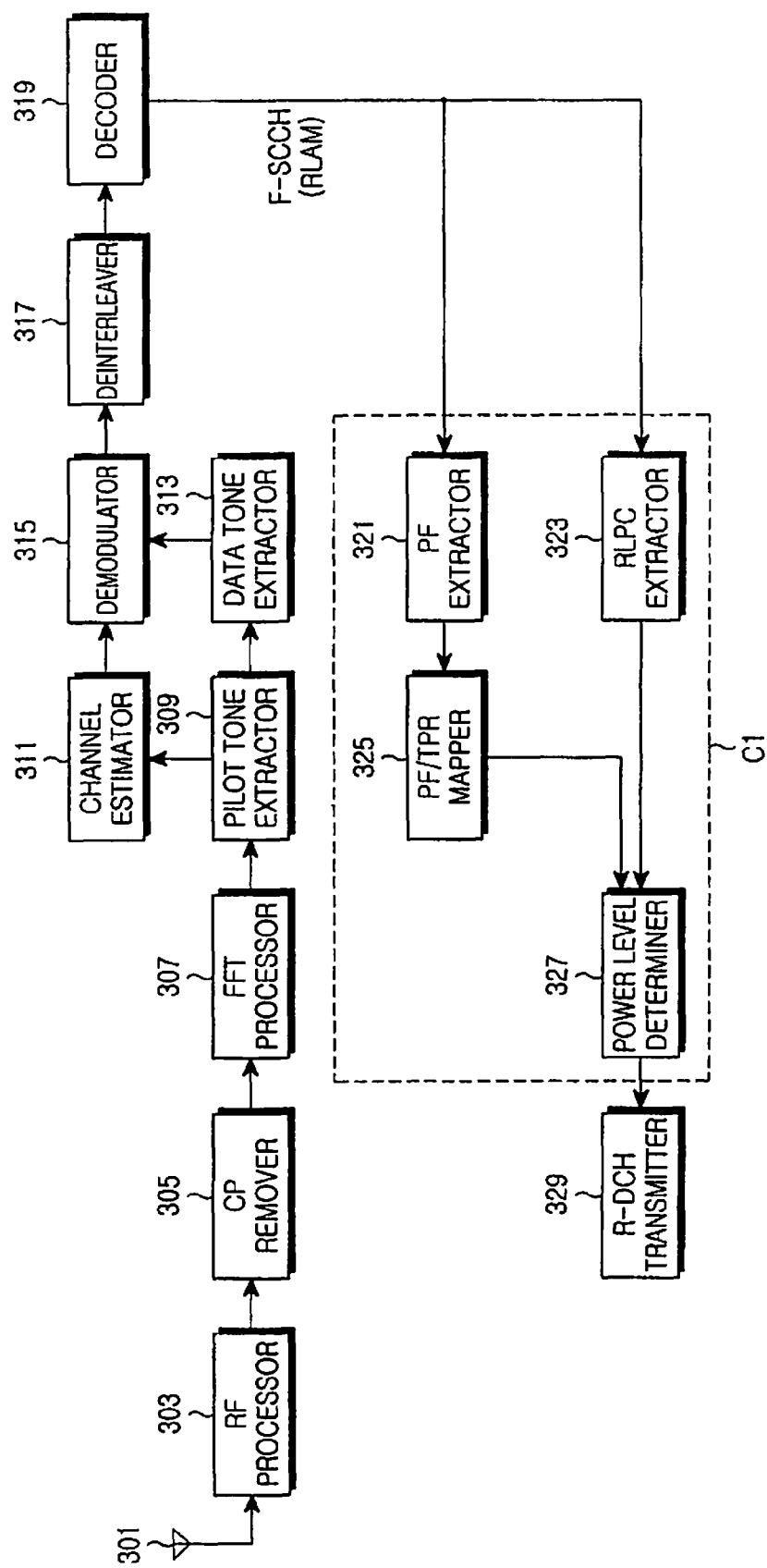
FIG. 3 illustrates a structure of a reception apparatus in an OFDM system according to the present invention.

FIG. 3 illustrates a structure of a reception apparatus for receiving an F-SCCH including an RLAM in an OFDM system according to the present invention. A reception module for receiving an OFDM signal from a wireless channel and restoring it to the original data, includes an RF processor 303 for frequency-down-converting the OFDM signal received from the wireless channel via an antenna 301 into a baseband signal, a CP remover 305 for removing a CP contaminated due to the propagation delay and multiple paths from the OFDM signal, a Fast Fourier Transform (FFT) processor 307 for converting the CP-removed time-domain OFDM signal into a frequency-domain signal, and a despreader (not shown) for despreading the frequency-domain OFDM signal and outputting tones of each signal.

In addition, the reception module includes a pilot tone extractor 309 for extracting a pilot tone from each of the despread signals, a data tone extractor 313 for extracting a data tone from each of the despread signals, a channel estimator 311 for estimating a channel using the extracted pilot tone, a demodulator 315 for performing demodulation on the data tone using the channel estimation result, a deinterleaver 317 for deinterleaving the demodulated data, and a decoder 319 for restoring the deinterleaved data to the original data.

The part most closely related to the main aspect of the present invention in FIG. 3 is the structure of receiving an RLAM including PF and/or RLPC field for transmission power control of the mobile station. Therefore, a role of a PF in the conventional Forward-Link Assignment Message (FLAM) is irrelevant to the main aspect of the present invention, so a detailed description of an F-DCH receiver related to the FLAM will be omitted herein for the sake of conciseness.

Further, the reception apparatus of FIG. 3 includes a power level adjuster C1 for determining a transmission power level of the data to be transmitted by the mobile station, according to the present invention. The power level adjuster C1 includes a PF extractor 321 for extracting a PF field of the RLAM received from the F-SCCH, an RLPC extractor 323 for extracting an RLPC field, a PF mapper 325 for outputting a DataCtoI$_{nominal,pf}$ value associated with the PF field value extracted by the PF extractor 321, and a power level determiner 327 for determining a nominal transmission power level using the DataCtoI$_{nominal,pf}$ value provided from the PF mapper 325, and additionally determining a relative transmission power level shifted by a DataCtoIOffset value from the nominal transmission power level, using the PSD offset value DataCtoIOffset of the RLPC field provided from the RLPC extractor 323. The output from the power level determiner 327 is sent to the R-DCH transmitter 329.

Figure 4:
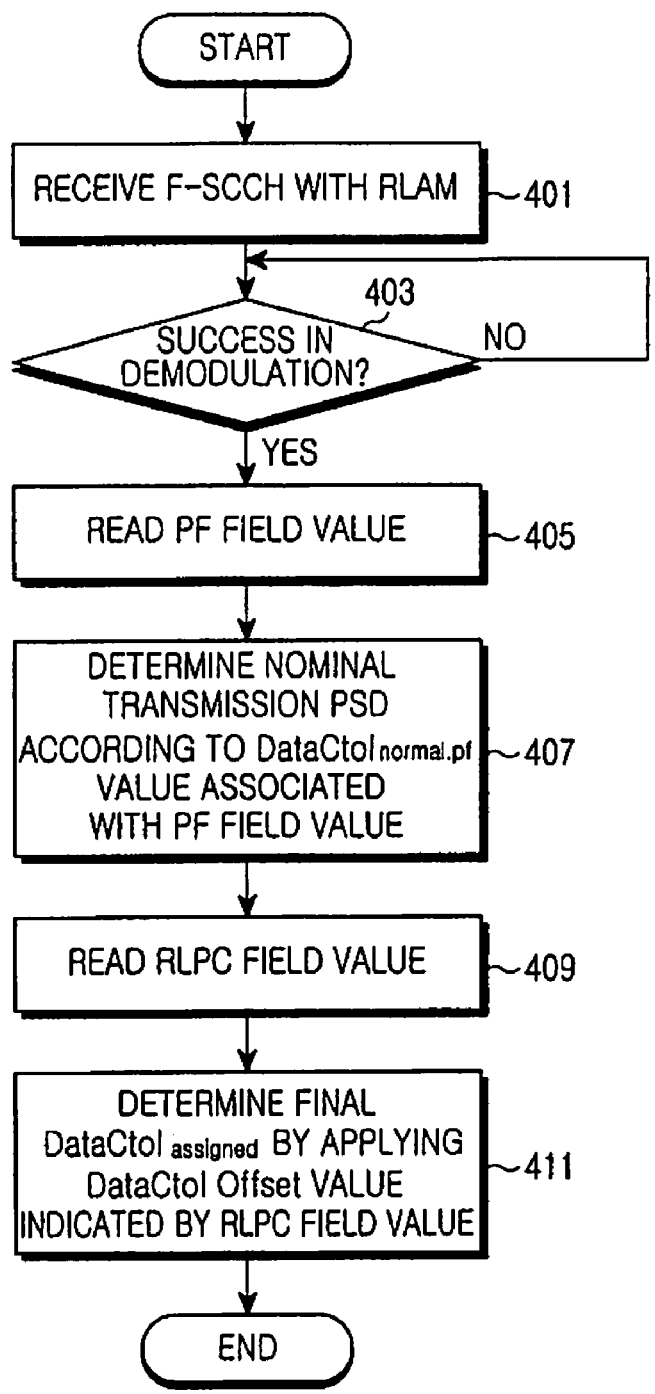
FIG. 4 illustrates a method for determining a reverse transmission power level of a mobile station in an OFDM system according to the present invention.

FIG. 4 illustrates a method for determining a reverse transmission power level of a mobile station in an OFDM system according to the present invention.

Referring to FIG. 4, in step 401, a mobile station receives from a base station an F-SCCH over which an RLAM is transmitted. If the mobile station successfully demodulates the F-SCCH in step 403, the mobile station proceeds to step 405 where it first reads a PF field from the received RLAM to determine nominal data transmission power. Thereafter, in step 407, the mobile station reads from a memory a DataCtoI$_{nominal,pf}$ value associated with the PF field value, and nominally determines a reverse transmission power level according to the DataCtoI$_{nominal,pf}$ value.

When there is a need for additional transmission power adjustment, the mobile station reads in step 409 a DataCtoIOffset value from the RLPC field with, for example, a 4-bit size. In step 411, the mobile station determines the final transmission power level which is adjusted in the positive or negative direction by the DataCtoI$_{nominal,pf}$ value from the transmission power level nominally determined in step 407 by applying the read DataCtoIOffset value to a DataCtoI$_{nominal,pf}$ value.

For example, if a size of the RLPC field is 4 bits, there are 16 DataCtoIOffset values. Therefore, 15 DataCtoIOffset values (values associated with 0000 to 1110) can be use as PSD offset values given when the scope between −7 dB to +7 dB is divided at intervals of 1 dB, and a DataCtoIOffset value associated with 1111 can be used for allowing the mobile station to use the current transmission PSD increment $\Delta_{LX}$ without change. In this case, if the nominal transmission PSD determined by the DataCtoI$_{nominal,pf}$ associated with the PF is 5 dB, since a DataCtoIOffset value 0010 of the RLPC field is −5 dB, the final transmission power level is 0 dB.

As is apparent from the foregoing description, the present invention nominally determines a nominal transmission power level of the mobile station according to a DataCtoI$_{nominal,pf}$ value mapped to the PF field value (Determination of Nominal Power Level), and finely adjusts the nominal power level depending on the DataCtoIOffset value of the RLPC field transmitted with a less number of bits compared with the prior art (Determination of Relative Power Level), thereby reducing the size of the RLPC field without a decrease in granularity of the power level compared with the prior art.

In addition, the present invention can determine the initial transmission power level based on the PF without reducing the number of bits required in the RLPC field, thereby enabling more accurate power control.

Further, the present invention enables a number of bits saved in the RLPC field to be used for other purposes, and also supports a dynamic change in the target number of HARQ transmissions, thereby enabling an efficient HARQ operation.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for determining reverse transmission power by a mobile station in an Orthogonal Frequency Division Multiplexing system, the method comprising:

receiving from a base station a Reverse-Link Assignment Message including a Packet Format (PF) field and a Reverse-Link Power Control (RLPC) field;

identifying a packet format based on the PF field;

determining a nominal reverse transmission power level based on a Data Carrier-to-Interference (DataCtoI) value associated with the packet format; and determining a relative final transmission power level shifted by an offset value defined in the RLPC field from the nominal transmission power level.

2. The method of claim 1, wherein determining the nominal reverse transmission power level further comprises:

checking carrier-to-interference Power Spectral Density (PSD) information $DataCtoI_{nominal.pf}$ for data, associated with the received PF, depending on a mapping table stored in a memory, and determining a nominal transmission power level according to the checked $DataCtoI_{nominal.pf}$.

3. The method of claim 2, wherein determining the relative final transmission power level further comprises:

determining the relative final transmission power level using $$DataCtoI_{assigned} = DataCtoI_{nominal.pf} + DataCtoIOffset$$

where $DataCtoI_{assigned}$ denotes a final power level, and DataCtoIOffset denotes an offset value defined in the RLPC field.

4. A mobile station apparatus for determining reverse transmission power in an Orthogonal Frequency Division Multiplexing system, the apparatus comprising:

a reception module for receiving from a base station a Reverse-Link Assignment Message (RLAM) including a Packet Format (PF) field and a Reverse-Link Power Control (RLPC) field; and a power level adjuster for identifying a packet format based on the PF field, determining a nominal reverse transmission power level based on a Data Carrier-to-Interference (DataCtoI) value associated with the packet format, and determining a relative final transmission power level shifted by an offset value defined in the RLPC field from the nominal transmission power level.

5. The mobile station apparatus of claim 4, wherein the power level adjuster further comprises:

a PF extractor for extracting a PF field from an RLAM received from a Forward-link Shared Control Channel;

an RLPC extractor for extracting an RLPC field;

a PF mapper for outputting a $DataCtoI_{nominal.pf}$ value associated with the PF field value extracted by the PF extractor; and a power level determiner for determining a nominal transmission power level using the $DataCtoI_{nominal.pf}$ value provided from the PF mapper, and additionally determining a relative transmission power level shifted by a DataCtoIOffset offset value from the nominal transmission power level using a Power Spectral Density (PSD) offset value DataCtoIOffset of the RLPC field provided from the RLPC extractor.

6. The mobile station apparatus of claim 5, wherein the power level determiner determines the relative final transmission power level using $$DataCtoI_{assigned} = DataCtoI_{nominal.pf} + DataCtoIOffset$$

where $DataCtoI_{assigned}$ denotes a final power level, and DataCtoIOffset denotes an offset value defined in the RLPC field.

* * * * *